United States Patent Office 3,149,140
Patented Sept. 15, 1964

3,149,140
PROCESS FOR PREPARING TERTIARY
BUTYL HYPOCHLORITE
Charles S. Nevin, Decatur, Ill., assignor to A. E. Staley Manufacturing Company, Decatur, Ill., a corporation of Delaware
No Drawing. Filed Oct. 6, 1961, Ser. No. 143,288
6 Claims. (Cl. 260—453)

This invention relates to the preparation of tertiary butyl hypochlorite. More specifically this invention relates to the preparation of tertiary butyl hypochlorite in a homogeneous aqueous system in the presence of a water-soluble alkali metal salt or alkaline earth metal salt of a weak acid.

Tertiary butyl hypochlorite is prepared by reacting tertiary butyl alcohol, a base and chlorine in either a one-phase or two-phase aqueous system, as taught by Teeter et al. in volume 32 of Organic Synthesis at pages 20 to 23 and Deanesly in United States Patent 1,938,175. When this process is carried out in a one-phase aqueous system according to the Teeter et al. disclosure, the alcohol and alkali metal hydroxide are first dissolved in water and then the system is saturated with chlorine. The tertiary butyl hypochlorite, which is insoluble in the aqueous phase at an acidic pH, separates from the aqueous phase and forms a second phase containing free chlorine, hypochlorous acid and hydrochloric acid. The crude product is washed with concentrated sodium carbonate and then with water in order to minimize the amount of free chlorine, hypochlorous acid and hydrochloric acid in the product. The washed product, which contains up to 2% free chlorine, is dried with calcium chloride. It is said that the tertiary butyl hypochlorite is 97 to 98% pure and is obtained in approximately 72 to 97% yields.

The above method of preparing tertiary butyl hypochlorite in a homogeneous aqueous phase has several drawbacks. The method requires several washing steps in order to produce a relatively pure product. These steps, in addition to being time-consuming, entail the loss of significant quantities of tertiary butyl hypochlorite in the sodium carbonate and water washes.

The object of this invention is to provide an economical method of preparing relatively pure tertiary butyl hypochlorite without requiring purification.

As conducive to a clearer understanding of my invention, it is helpful to examine in some detail the preparation of tertiary butyl hypochlorite as it is presented in the Teeter et al. and Deanesly references. In simplified form, the chemical composition of the reaction mixture of Teeter et al. can be represented at various stages by the following three equations (R represents the tertiary butyl radical):

(A) $2NaOH + Cl_2 + ROH \rightarrow \frac{1}{2}ROCl + NaCl + \frac{1}{2}NaOCl + \frac{1}{2}RONa + \frac{3}{2}H_2O$ (B) $2NaOH + \frac{3}{2}Cl_2 + ROH \rightarrow ROCl + \frac{3}{2}NaCl + \frac{1}{2}NaOCl + \frac{3}{2}H_2O$ (C) $2NaOH + 2Cl_2 + ROH \rightarrow ROCl + 2NaCl + HOCl + H_2O$ Equations A and B in simplified form represent the composition of the reaction mixture after 1 and after 1½ moles of $Cl_2$ have been added to the reaction mixture. In each case, the tertiary butyl hypochlorite is dissolved in the alkaline aqueous medium. Equation C represents in simplified form the composition after the addition of 2 moles of $Cl_2$ to the reaction mixture; at this point the reaction mixture is highly acidic (pH 1.5–2.0). At some point during the addition of the last half mole of $Cl_2$, the tertiary butyl hypochlorite forms a separate phase, precipitating out of the acidic aqueous reaction phase. While all of these equations are somewhat simplified, equation C is particularly so since the two-phase system actually contains a substantial amount of free chlorine and some HCl. These are present because the base present is insufficient to react with all the $Cl_2$ added to the reaction zone. To remove these acidic materials, Teeter et al. suggest that the reaction product be washed with sodium carbonate.

Deanesly (Patent Number 1,938,175) suggests that alkyl hypohalites can be prepared by reacting substantially equal molal quantities of chlorine, alcohol and base in a two-phase system or in a homogenous system. Deanesly apparently describes a multi-phase system at page 1, line 89 et seq. where he states that tertiary butyl hypochlorite is prepared by passing sodium hydroxide and tertiary butyl alcohol down a scrubbing column while at the same time passing chlorine up the column. The crude product which comes out of the bottom of the column is purportedly purified by distilling off gaseous chlorine. In contrast to Deanesly's suggestion that alkyl hypohalites can be prepared in either a two-phase system or in a homogeneous aqueous system using substantially equal molal concentrations of halogen, alcohol and base, I have found that the yield is reduced unless the reaction is carried out in a homogeneous aqueous phase. In a two-phase system, the yield is reduced because the yield varies with the amount of water present (within limits). The reactants are not in as good contact with each other as in a homogeneous system. Further, I have found, any homogeneous system according to Deanesly requires an excess of chlorine. This excess of chlorine, although small, is needed to perform two functions: (1) it pushes the equilibrium reaction to completion and (2) it makes the system sufficiently acidic to insure the separation of the tertiary butyl hypochlorite from the aqueous layer (e.g., tertiary butyl hypochlorite is least soluble in water at a pH of about 4.5 to 5.2). While it increases the yield, this excess chlorine necessarily yields a reaction product that is contaminated with a significant amount of free chlorine. This is illustrated hereafter (Example VII), where the addition of chlorine was terminated at a pH of about 6 in the reaction medium; the tertiary butyl hypochlorite layer contained about 5% free chlorine.

The lower the pH of the final reaction product, the higher the concentration of free halogen. Even if one attempts to prepare tertiary alkyl hypohalites in a homogeneous aqueous system using substantially equal molal concentrations of halogen, base and alcohol, as suggested by Deanesly, the tertiary alkyl hypohalites contain an undesirable concentration of free halogen, simply because the reaction is incomplete under these conditions.

I have now found that I can minimize the concentration of free chlorine, hypochlorous acid and hydrochloric acid in tertiary butyl hypochlorite to the point where purification is unnecessary by carrying out the above reaction in the presence of a basic water-soluble alkali metal salt of a weak acid or an alkaline earth metal salt of a weak acid, and by terminating the addition of chlorine when the reaction mixture reaches a pH of between about 4 and 6. The aforementioned salts, while contributing to the initial alkalinity of the reaction mixture, buffer the final reaction product at a slightly acidic pH and suppress the accumulation of free chlorine, hypochlorous acid and hydrochloric acid in the tertiary butyl hypochlorite. Generally, the lower the pH of the final reaction mixture, the greater the chlorine contamination. On the other hand, if the reaction is terminated at too high a pH, the tertiary butyl hypochlorite is not as insoluble in the aqueous phase as one might desire. Accordingly, the final pH of the reaction mixture controls the purity and yield of the tertiary butyl hypochlorite. The products prepared according to my invention can be consistently prepared in over 90% yields (usually in excess of 95%) having less than about 2% free chlorine. I have found that this technique is specific to the preparation of tertiary butyl hypochlorite and will not yield other hypohalites, such as tertiary amyl hypochlorite or tertiary butyl hypobromite in the above high yields or high purity.

The following compounds are representative of the various alkaline water-soluble alkali metal and alkaline earth metal salts of weak acids that can be employed in this invention: sodium carbonate, potassium carbonate, barium acetate, calcium acetate, sodium acetate, disodium phosphate, trisodium phosphate, etc. The disodium and trisodium phosphates are alkaline salts of the weak acid monosodium phosphate for the purposes of this invention and the group $NaPO_4^=$ is accordingly viewed as the anion moiety of a weak acid. While some of the water-soluble salts, such as trisodium phosphate, can be used in a concentration sufficient to furnish all of the alkalinity required in this reaction, it is usually more economical to use an alkali metal hydroxide (sodium hydroxide or potassium hydroxide) to furnish most of the alkalinity required in the reaction medium. Further, the relatively inexpensive alkali metal carbonates cannot be used as the sole source of alkaline material because they produce copious quantities of carbon dioxide towards the end of the reaction. In some cases, the relatively low water-solubility of the salt prevents its use as the sole source of alkalinity. Generally, I prefer to have the cation portion of the metal salt provide from about 4 to 25 percent of the total equivalents of unneutralized alkali metal and alkaline earth metal in the reaction mixture. The sodium ion in $NaPO_4^=$ is viewed as a neutralized ion.

The concentration of the various reactants used in this invention are dependent in the following manner. The alkaline material (metal salt and alkali metal hydroxide) must be present in a concentration sufficient to provide at least about one equivalent of metal cation (alkali metal or alkaline earth metal) for each diatomic mole of chlorine in order to have as small a concentration of free chlorine in the tertiary butyl hypochlorite as possible. While an excess of one diatomic mole of chorine must be used in the reaction per each mole of alcohol in order to get complete conversion of all the alcohol to tertiary butyl hypochlorite, the diatomic chlorine must be used in a sufficient quantity to provide along with the anion portion of the metal salt sufficient acidity to give the reaction medium a final pH of from about 4 to 6. The various reactants can be used in a concentration as high as 2.5 equivalents of alkaline material and 4 equivalents of chlorine (2 diatomic moles) per equivalent or mole of tertiary butyl alcohol. However, it is much more economical and a purer product results when approximately one equivalent of alkaline material (in terms of the combined cation from the alkali metal hydroxide and metal salt) and one diatomic mole of chlorine are employed per mole of alcohol. The preferred ratio of reactants is from about 1.01 to 1.10 diatomic moles of chlorine and 1.02 to 1.20 equivalents of alkaline material per mole of alcohol. In practice the concentration of the alkaline material and the final pH of the reaction mixture determine the concentration of the chlorine.

In somewhat greater detail the tertiary butyl alcohol is dissolved in about 8 to about 20 times its weight of water and the alkaline material is added to the solution in order to form the alcoholate. Alternatively, the alcohol is added to the alkaline aqueous solution. However, in either case the alcoholate should be dissolved only in sufficient water to form a homogeneous phase. When more water is used than is necessary for this purpose, the yield of tertiary butyl hypochlorite is diminished somewhat. However, if sufficient water is not used to form a homogeneous phase, then the yields are considerably reduced. For example, when tertiary butyl alcohol was dispersed in four times its weight of water, the yield of tertiary butyl hypochlorite was only 62%.

Chlorine is then bubbled into the reaction mixture until the pH of the reaction mixture drops to between 4 and 6, preferably 4.5 to 5.2. The relatively pure tertiary butyl hypochlorite phase is then partitioned from the aqueous phase.

The reaction can be carried out at from about $-29°$ C. up to the boiling point of the tertiary butyl hypochlorite (79° C.). However, it is preferable to maintain the exothermic reaction at from about 10° C. to 40° C. Higher temperatures result in decreased yields and somewhat higher concentrations of free chlorine. Further, more water must be employed, since the alcoholates are less soluble in water at higher temperatures.

After the separation of the tertiary butyl hypochlorite phase, the aqueous phase can be recycled in order to run a second and third batch, etc., of tertiary butyl hypochlorite. An additional 20% by weight water has to be added to the aqueous phase in order to dissolve the new alcoholate. This is necessary to reduce the concentration of the salt formed in the preceding cycle. Recycling adds an extra 2–3% to the yield, but it decreases the purity of the hypochlorite about 1%.

The following examples are merely illustrative and should not be construed as limiting the scope of the invention.

Example I

Two hundred ninety-six and one-half grams of tertiary butyl alcohol (4.0 moles), 152 grams of sodium hydroxide (3.8 moles) and 29.7 grams of sodium carbonate (0.28 mole) were dissolved in 2,650 grams of tap water in a four-liter flask equipped with a flat-paddle stirrer and a coarse fritted glass dispersion tube. Three hundred and three grams of chlorine gas (4.28 moles) were bubbled into the system over the course of one hour while maintaining the reaction zone at 25 to 30° C. Four hundred sixteen and one-half grams tertiary butyl hypochlorite, which formed a separate phase, was separated from the aqueous phase (pH 5.1) in a separatory funnel. This represented a 96% yield of tertiary butyl hypochlorite having 95% true tertiary butyl hypochlorite. The product had 0.7% by weight free chlorine as determined by the method set forth in Scott's Standard Methods of Chemical Analysis, vol. I, page 274 (1939).

The above example illustrates the preparation of tertiary butyl hypochlorite in high yields without any purification having actually less free chlorine contamination than products prepared by the method of Teeter et al. which requires several washing steps and a drying step.

Example II

Three thousand and three grams of the water phase from the preceding example were placed in a four-liter flask equipped as in Example I. Twenty-nine and seven-tenths grams of sodium carbonate (0.28 mole), 144 grams sodium hydroxide (3.6 moles) and 296.5 grams of tertiary butyl alcohol (4.0 moles) were added to the flask with stirring. An additional 650 grams of water had to be added before a homogeneous single phase was formed. Three hundred and three grams of chlorine gas (4.28 moles) were bubbled into the system over the course of one hour while maintaining the reaction zone at 25 to 30° C. Four hundred forty-one and one-tenth grams of tertiary butyl hypochlorite were separated from the aqueous phase (pH 4.3). This represented a 101% yield of tertiary alkyl hypochlorite that contained 1.7% by weight free chlorine.

The high yield in this example indicated that some of the tertiary butyl hypochlorite that had been dissolved in the aqueous phase of the preceding example was recovered.

Example III

One thousand nine hundred and seventy-five grams of the aqueous phase of Example II and 400 grams of fresh tap water were added to a four-later flask. Fourteen and eighty-five hundredths grams of sodium carbonate (0.14 mole), 76 grams sodium hydroxide (1.9 mole) and 148.2 grams tertiary butyl alcohol (2.0 moles) were dissolved in the aqueous salt solution. One hundred forty-eight and five-tenths grams of chlorine gas (2.09 moles) were bubbled into the system over a 30-minute period, while the reaction zone was maintained at 25 to 30° C. Two hundred and thirteen grams of tertiary butyl hypochlorite (98% yield) were separated from the aqueous phase (pH 4.9). The tertiary butyl hypochlorite contanied 1.8% by weight free chlorine.

*Example IV*

Example I was repeated except that 3.72 moles of sodium hydroxide and 4.12 moles of chlorine gas were used. Four hundred and two grams of tertiary butyl hypochlorite (93% yield) was separated from the aqueous phase (pH 5.5). The product contained 0.5% by weight free chlorine.

*Example V*

Example I was repeated except that the reaction was carried out at 45 to 50° C. Three hundred and eighty-one grams of tertiary butyl hypochlorite (87%) were separated from the aqueous phase (pH 4.45). The product contained 3.5% by weight free chlorine. This example illustrates that as the reaction temperature increases, the purity and yield of the desired product decreases.

*Example VI*

Example I was repeated except that the reaction was carried out at 15 to 20° C. Four hundred and eight grams of tertiary butyl hypochlorite (94%) were separated from the aqueous phase (pH 4.5). The product contained about 2% free chlorine.

*Example VII*

This example illustrates the preparation of a tertiary butyl hypochlorite in the absence of a metal salt of a weak acid. Example I was repeated except that all of the alkaline material was provided by 164 grams of sodium hydroxide (4.08 moles). Four hundred grams of tertiary butyl hypochlorite (92%) were separated from the aqueous phase (pH 6). This product contained 90% true tertiary butyl hypochlorite and had 5% by weight free chlorine. Two hundred and seventy-seven grams of this crude product was washed once with a 50 ml. of a 5% sodium carbonate aqueous solution. The resultant single-washed tertiary butyl hypochlorite weighed 270 grams (7 grams lost on washing with the yield reduced to 90% based on original alcohol concentration) and contained 3.0 weight percent free chlorine.

The above example illustrates that even when a minimum excess of chlorine is employed in the preparation of a tertiary butyl hypochlorite (pH of aqueous layer was 6) the product contains a considerable excess of free chlorine even after an alkaline wash in contrast to the unpurified products prepared in the presence of a metal salt of a weak acid in accordance with this invention. The example also shows that the yield of tertiary butyl hypochlorite is reduced by the washing because the product is somewhat soluble in the 5% aqueous sodium carbonate washing medium.

Since many embodiments of this invention may be made and since many changes may be made in the embodiments described, the foregoing is interpreted as illustrative only and my invention is defined by the claims appended hereafter.

I claim:

1. The process of preparing tertiary butyl hypochlorite, which comprises providing a homogeneous alkaline aqueous solution comprising tertiary butyl alcohol, water and an alkaline material, wherein said alkaline material is selected from the group consisting of a water-soluble alkali material salt of a weak acid and alkaline earth metal salt of acetic acid, and mixtures thereof with an alkali metal hydroxide, the water in said aqueous alkaline homogeneous solution comprising about 8 to 20 parts by weight per each part of tertiary butyl alcohol and said aqueous solution initially containing at least 1 equivalent of alkaline material per each mole of tertiary butyl alcohol, adding chlorine while maintaining the reaction at a temperature below the boiling point of tertiary butyl hypochlorite, and separating insoluble tertiary butyl hypochlorite from the aqueous solution when the pH of the aqueous medium is between about 4 and 6.

2. The process of preparing tertiary butyl hypochlorite, which comprises providing a homogeneous alkaline aqueous solution comprising tertiary butyl alcohol, water and an alkaline material, wherein said alkaline material comprises from 96 to 75 equivalent percent alkali metal hydroxide and from 4 to 25 equivalent percent of a water-soluble salt selected from the group consisting of an alkali metal salt of a weak acid, an alkaline earth metal salt of a weak acid and mixtures thereof, the water in said aqueous solution comprising about 8 to 20 parts by weight per each part of tertiary butyl alcohol and said aqueous solution initially containing at least 1 equivalent of alkaline material per each mole of tertiary butyl alcohol, adding chlorine while maintaining the reaction at a temperature below the boiling point of tertiary butyl hypochlorite, and separating insoluble tertiary butyl hypochlorite from the aqueous solution when the pH of the aqueous medium is between about 4 and 6.

3. The process of claim 2 wherein the water-soluble salt is sodium carbonate.

4. The process of claim 2 wherein about one diatomic mole of chlorine is reacted with each mole of tertiary butyl alcohol in the presence of about one equivalent of alkaline material.

5. The process of claim 2 wherein about 1.01 to 1.10 diatomic moles of chlorine is reacted with each mole of tertiary butyl alcohol in the presence of 1.02 to 1.20 equivalents of alkaline material.

6. The process of claim 2 wherein the reaction is carried out in the temperature range from 10° C. to 40° C.

References Cited in the file of this patent

Teeter et al.: "Organic Synthesis," vol. 32, pp. 20–23 (1952).

Anbar et al.: "Chemical Reviews," vol. 54, pp. 925–953, 927 (1954).